June 21, 1966  A. FISCHER  3,256,661
ANCHORING ARRANGEMENT
Filed July 11, 1962  2 Sheets-Sheet 1

INVENTOR.
ARTUR FISCHER
BY
Michael S. Striker
Atty

June 21, 1966   A. FISCHER   3,256,661
ANCHORING ARRANGEMENT
Filed July 11, 1962   2 Sheets-Sheet 2
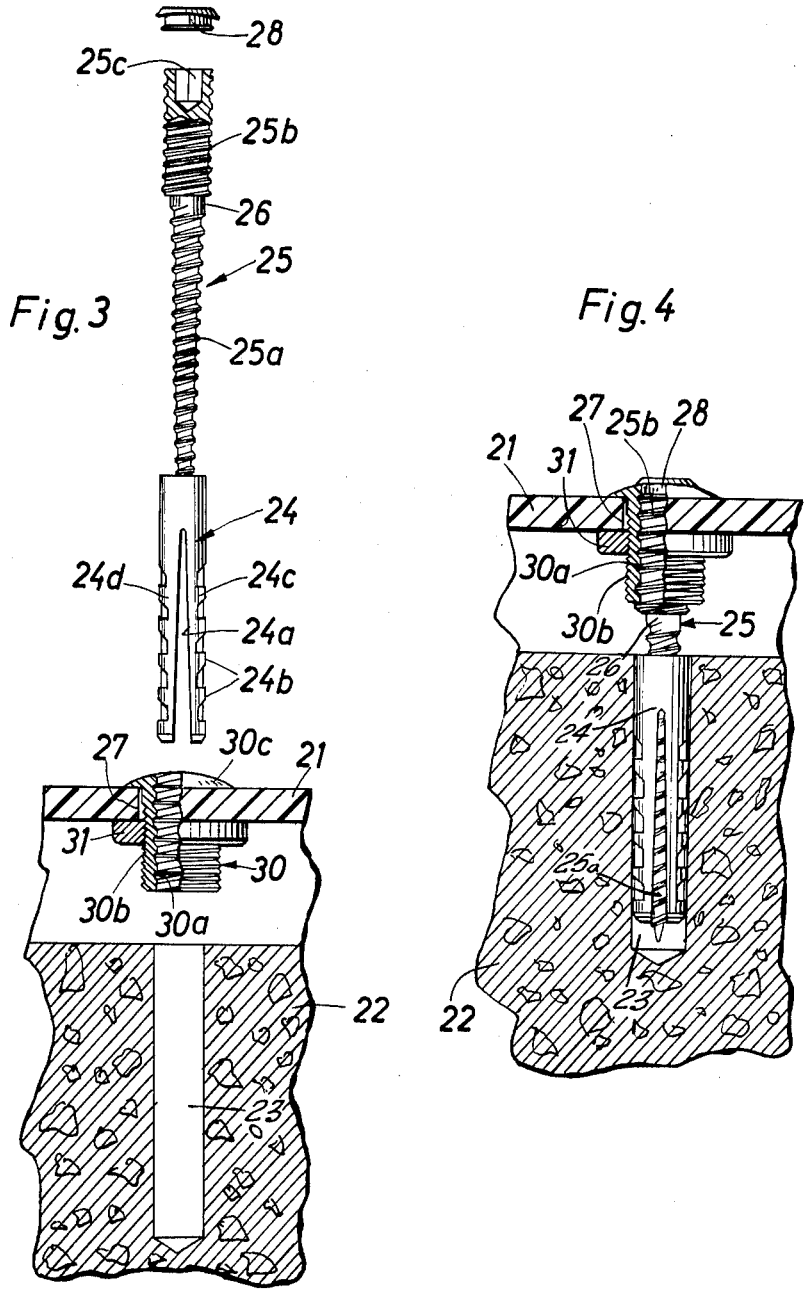
INVENTOR.
ARTUR FISCHER
BY
Michael S. Striker

United States Patent Office 3,256,661
Patented June 21, 1966

3,256,661
ANCHORING ARRANGEMENT
Artur Fischer, Tumlingen, Kreis Freudenstadt, Germany
Filed July 11, 1962, Ser. No. 209,104
Claims priority, application Germany, Oct. 25, 1961,
F 35,210
9 Claims. (Cl. 52—373)

The present invention relates to fastening devices in general, and more particularly to an anchoring arrangement which is especially suited for securing one or more wooden, metallic or plastic structures to a comparatively brittle wall or another piece of masonry whose material is such that it cannot retain a screw, a spindle or another axternally threaded member. For example, the anchoring arrangement of my invention may be used for securing a door frame to a concrete-, brick- or plastic wall in such a way that the door frame may be moved into actual abutment with or that the frame remains spaced from the wall.

It is an important object of the present invention to provide an extremely simple but highly reliable anchoring arrangement which is capable of properly securing one or more wooden, metallic or plastic structures to smooth-faced or uneven walls or other pieces of masonry and which permits rapid and convenient disconnection of the supported structure or structures if such disconnection should become necessary.

Another object of the invention is to provide a highly reliable anchoring arrangement of the just outlined characteristics which will properly and strongly secure a structure to a piece of masonry even if the wall thickness of the supported structure is negligible and even if the material of the supported structure is such that it cannot properly retain an externally threaded member.

A further object of the invention is to provide an anchoring arrangement of the above described type which is assembled in such a way that any apertures in the supported structure may be conveniently concealed as soon as the anchoring arrangement is in operative position.

An additional object of my invention is to provide a novel externally threaded member for use in an anchoring arrangement of the above outlined characteristics.

A concomitant object of the inventin is to provide an anchoring arrangement which is especially suited for securing structures consisting of wood or plastic material to brittle walls and similar pieces of masonry.

Still another object of the invention is to provide an anchoring arrangement which is especially suited for use in private homes, apartments and similar residences in which appearance is of considerable importance and in which a proper sealing connection between a door frame and a wall may be of great advantage to prevent draft of entry of moisture.

A further object of the instant invention is to provide an anchoring arrangement of the above outlined characteristics which is constructed and assembled in such a way that it may maintain one or more supported structures at a desired distance from a wall or another supporting body.

Another object of my invention is to provide a novel connection which includes a support of comparatively brittle material, a supported structure, and an anchoring arrangement of the above outlined characteristics which provides a strong and reliable connection between the support and the supported structure.

With the above objects in view, the invention resides in the provision of a connection including a support of comparatively brittle material and having an exposed side, a supported structure of wood or the like which is provided with a hole in registery with and providing access to the aperture of the support, and an anchoring arrangement including an expansible sleeve which is receiped in the aperture of the support and an externally threaded elongated member which includes as a first threaded portion received in the sleeve to expand the latter into firm engagement with the support and a second threaded portion which is received in the hole of the supported structure and which is either directly or indirectly anchored in this supported structure so that the latter is secured to the support through the intermediatry of the aforementioned sleeve and of the externally threaded member.

In accordance with a more specific feature of my invention, the anchoring arrangement may comprise an internally threaded tubular member or bush which is retained in the hole of the supported structure and which meshes with the second threaded portion of the elongated member.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

FIG. 3 is an exploded view of a modified anchoring arrangement which is utilized for securing a thin-walled structure to a brick-, concrete- or plastic wall; and FIG. 4 illustrates the anchoring arrangement of FIG. 3 in assembled position in which the thin-walled structure is secured to the wall.

Figure 1:
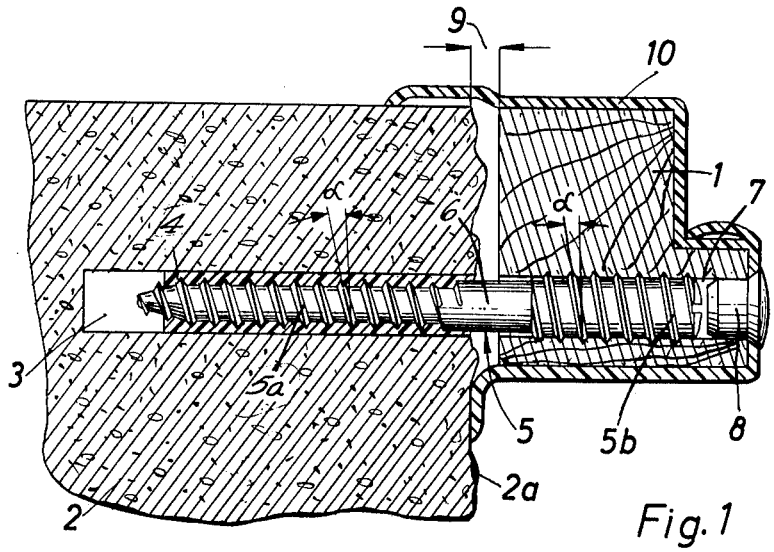
FIG. 1 is a sectional through a supporting body in the form of a wall and through a supported structure which latter is secured to the wall by an anchoring arrangement embodying one form of my invention.

Referring now in greater detail to the illustrated embodiments, and first to FIG. 1, there is shown an anchoring arrangement which is utilized for securing a door frame 1 or a similar structure to a concrete-, brick- or plaster wall 2 or to another piece of masonry. As shown, the exposed side 2a of the wall 2 is uneven and this wall is provided with an aperture in the form of a blind bore 3 which extends inwardly from the exposed side 2a. The anchoring arrangement comprises an expandible sleeve 4 which preferably consists of tough synthetic plastic material and which is preferably provided with a diametral slot extending from its left-hand end toward but short of its right-hand end, as viewed in FIG. 1. In the illustrated embodiment, the sleeve 4 is formed with internal threads which mate with external threads 5a of an elongated externally threaded member of screw 5. The threads 5a are adjacent to the tip of the screw 5, and this screw is provided with a second set of larger-diameter threads 5b which are screwed into a hole 7 drilled in the supported structure 1, the latter being assumed to consist of wood. When the anchoring arrangement of my invention is assembled, the hole 7 is in registry with the bore 3 and the slotted head of the screw 5 is fully concealed in the hole 7.

The pitch alpha of threads 5a is identical with the pitch of threads 5b, and the diameter of the front portion of the screw 5 (i.e., of that portion which is provided with the threads 5a) is selected in such a way that, when the screw is driven home to the extent illustrated in FIG. 1, the threads 5a expand the sleeve 4 into firm engagement with the wall bounding the bore 3 so that the screw 5 is securely retained in the wall 2. At the same time, the threads 5b bite into the material of the supported structure 1 and retain this structure at a selected distance from the exposed side 2a of the supporting wall 2. It will be noted that the threads 5a are separated from the threads 5b by a smooth cylindrical median portion of the screw 5.

The anchoring arrangement of FIG. 1 is assembled as follows:

In the first step, a person screws the threads 5a to a small extent into the sleeve 4 so that the slotted front section of the sleeve 4 does not expand to an appreciable extent and the sleeve may be introduced through the hole 7 and into the bore 3. The threads 5b are still located at the outer side of the structure 1. The operator then continues to turn the screw 5 and thereby expands the sleeve 4 into firm frictional engagement with the wall bounding the hole 3 by simultaneously driving the threads 5b into the material surrounding the hole 7. The screw 5 is driven home to such an extent that the left-hand face of the structure 1 comes close to or actually abuts against the most pronounced protuberance on the exposed side 2a of the wall 2. In a final step, the structure 1 may be coated with a layer 10 of plastic material which provides a moistureproof insulation for the structure 1 and which also seals the gap 9 between the wall 2 and the structure 1 by extending into sealing abutment with the wall. If desired, a sealing element in the form of a plug 8 may be introduced into the open end of the hole 7 to fully conceal the slotted head of the screw 5.

The connection between the wall 2 and the structure 1 may be terminated upon removal of the plug 8 and in response to turning of the screw 5 in a sense to withdraw the threads 5a, 5b from the sleeve 4 and the hole 7, respectively.

The provision of threads 5a, 5b whose pitch alpha is the same is of considerable advantage whenever the exposed side of the supporting wall 2 is uneven because such threads enable the screw 5 to maintain the supported structure 1 at a selected distance from the wall.

Figure 2:
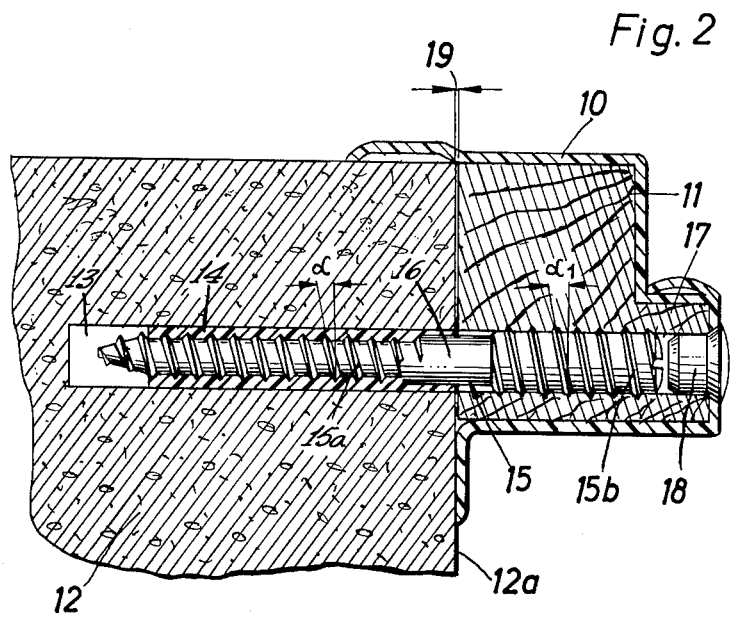
FIG. 2 is a similar sectional view of a supporting wall and of a supported structure which latter is secured to the wall by a slightly different anchoring arrangement in such a way that the inner side of the supported structure is immediately adjacent to or comes into actual abutment with the supporting wall.

FIG. 2 illustrates a modified anchoring arrangement which is very similar to the arrangement of FIG. 1 with the exception that the supporting wall 12 is formed with a smooth and flat exposed side 12a so that, if desired, the adjacent inner side of the supported structure 11 may be moved into actual abutment with the wall. In other words, the width of the gap 19 is very small or is reduced to zero. In such instances, the screw 15 is preferably provided with a rear threaded portion having threads 15b whose pitch alpha$_1$ is steeper than the pitch alpha of threads 15b on the front portion of this screw. Consequently, when a manipulator inserts the sleeve 14 into the predrilled aperture or bore 13 of the supporting wall 12, and when the manipulator thereupon turns the screw 15 in a sense to expand the sleeve 14 and to drive the threads 15b into the material surrounding the hole 17 in the supported structure 11, the latter is automatically drawn toward or into actual abutment with the exposed side 11a. The manner in which the plastic coating 10 is applied about the structure 11 and in which the plug 8 conceals the slotted head of the screw 15 is the same as described in connection with FIG. 1. If desired, the plug 8 may consist of the same material as the coating 10 so as to insure that the plug is hardly discernible to the eye of a casual observer.

The threads 15a, 15b are again separated by a smooth cylindrical median section 16 of the screw 15.

It is assumed that the threads 5a, 5b and 15a, 15b are of the so-called wood screw thread type, and it is also assumed that the material of the supporting wall 2 or 12 is such as to be unable to form a strong connection with the threads 5a or 15a.

FIG. 3 illustrates a further anchoring arrangement which utilizes a screw 25 provided with a set of smaller-diameter threads 25a and with a set of larger-diameter threads 25b, the two sets of threads being separated by a smooth cylindrical or frustoconical median section 26. It will be noted that the front section of the screw 25 (i.e., that section which is provided with threads 25a) tapers in a direction from the median section 26 toward the tip of the screw. The diameter of the rear screw section which is provided with the threads 25b may be constant all the way from the median section 26 to a recess or slot 25c, the latter serving as a means for receiving the operating end of a screwdriver or another suitable rotation transmitting tool, not shown. The threads 25a are adapted to cooperate with an expansible sleeve 24 which is provided with a diametral slot 24a and with wall-engaging external teeth 24b. These teeth bite into the material surrounding the aperture or blind bore 23 of a wall 22 which serves as a support for a thin-walled structure 21. The structure 21 is assumed to take the form of a cupped, U-shaped or L-shaped wooden or plastic article which is to be permanently or detachably secured to the wall 22. Since the walls of the article 21 are comparatively thin, I provide a special tubular member or bush 30 which is formed with internal threads 30a adapted to mesh with external threads 25b of the screw 25, and with external threads 30b which are adapted to mate with internal threads of a retaining nut 31.

FIG. 3 illustrates the parts of the anchoring arrangement in partly assembled position in which the expansible sleeve 24 is about to be inserted into the aperture 23. The bush 30 has been inserted through the hole 27 in the supported structure 21 so that its larger-diameter head 30c abuts against the outer side of this structure. The inner side of the structure 21 is engaged by the retaining nut 31 which meshes with the external threads 30b and which thereby maintains the head 30c in abutment with the outer side of the structure 21. In the next step, the operator screws the foremost portion or tip of the screw 25 into the unslotted rear section of the sleeve 24 without as yet expanding the slotted section of this sleeve, and the sleeve is thereupon introduced through the bush 30 and into the bore 23. If the operator thereupon rotates the screw 25 in a sense to drive the threads 25a between the tongues 24c, 24d of the sleeve 24, the teeth 24b are caused to penetrate into the material of the wall 22 and retain the sleeve in this wall with a force sufficient to prevent any undesirable displacements of the supported structure 21. When the tongues 24c, 24d of the sleeve 24 are properly expanded into engagement with the material surrounding the bore 23, the threads 30a already mesh with the threads 25b and the head of the screw 25 including the recess 25c is concealed in the bush. The anchoring arrangement then assumes the position of FIG. 4, and the open outer end of the bush 30 may be sealed by a plug 28 to conceal the recess 30c. The pitch of the threads 25a may but need not be the same as the pitch of the threads 25b. As shown, the threads 25a, 25b are of the so-called wood screw thread type.

It will be readily understood that, if the wall thickness of the supported structure 21 is negligible or if the material of this supported structure cannot form a strong connection with an externally threaded member, the provision of the tubular member 30 insures that the supported structure 21 is properly secured to the supporting wall 22. Of course, the position of the head 30c and of the nut 31 may be reversed if desired, i.e., the nut 31 may be located at the outer side of the supported structure, and this nut may be provided with four or six facets to be readily engaged by a wrench or another tool in the event that a person desires to separate the bush 30 from the supported structure. It is also possible to provide the supported structure with an external insulating or fluid-proof coating in the same manner as described in connection with FIGS. 1 and 2.

In making the aperture 23, the operator places the structure 21 in the position of FIG. 3 and thereupon introduces a stone drill through the bush 30.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A connection of the character described, comprising a support of comparatively brittle material, said support having an exposed side and an aperture extending inwardly from said exposed side; a supported structure having a hole in registry with said aperture; and an anchoring arrangement for securing said structure to said support, said anchoring arrangement comprising an expansible sleeve receive in said aperture the diameter of said hole being at least equal to the maximum transverse dimension of said sleeve in unexpanded condition so as to facilitate insertion of said sleeve through the hole and into the aperture, and an elongated externally threaded member having a first threaded portion of smaller diameter received in and expanding said sleeve into firm engagement with said support, and a second threaded portion of larger diameter received in said hole and biting into the material of said supported structure.

2. A structure as set forth in claim 1, wherein said support is a piece of masonry and wherein said supported structure consists of wood.

3. A structure as set forth in claim 1, wherein the lead of the threads on said first portion is identical with the lead of the threads on said second portion.

4. A structure as set forth in claim 1, wherein the lead of the threads on said first portion is longer than the lead of the threads on said second portion.

5. A connection of the character described, comprising a support of comparatively brittle material, said support having an exposed side and an aperture extending inwardly from said exposed side; a supported structure having a hole in registry with said aperture; and an anchoring arrangement comprising an expansible sleeve received in said aperture, an internally threaded tubular member received in said hole, said tubular member having a minimum internal diameter at least equal to the maximum transverse dimension of said sleeve in unexpanded condition so as to facilitate insertion of said sleeve through the tubular member and into the aperture, and an elongated externally threaded member having a first threaded portion of smaller diameter received in and expanding said sleeve into firm engagement with said support, and a second threaded portion of larger diameter meshing with said internally threaded tubular member.

6. A connection as set forth in claim 5, wherein said supported structure has a first side at one end of said hole and a second side at the other end of said hole, said tubular member having external threads and a head at one side of said supported structure and said tubular member extending beyond the other side of said supported structure, and a retaining nut meshing with said tubular member and engaging the other side of said supported structure for retaining said tubular member in said hole.

7. An anchoring arrangement as set forth in claim 5, wherein said tubular member is provided with external threads and further comprising means for retaining said tubular member in the hole of the supported structure, including a nut which meshes with the external threads of said tubular member.

8. A connection of the character described, comprising a support of comparatively brittle material, said support having an exposed side and an aperture extending inwardly from said exposed side; a supported structure having a hole in registry with said aperture; an anchoring arrangement for securing said structure to said support, said anchoring arrangement comprising an expansible sleeve received in said aperture the diameter of said hole being at least equal to the maximum transverse dimension of said sleeve in unexpanded condition so as to facilitate insertion of said sleeve through the hole and into the aperture, and an elongated externally threaded member having a first threaded portion of smaller diameter received in and expanding said sleeve into firm engagement with said support, and a second threaded portion of larger diameter received in said hole and biting into the material of said support; and a plastic coating surrounding said supported structure and sealingly engaging said support.

9. A connection of the character described, comprising a support of comparatively brittle material, said support having an exposed side and an aperture extending inwardly from said exposed side; a supported structure having a hole in registry with said aperture; and an anchoring arrangement for securing said structure to said support, said anchoring arrangement comprising an expansible sleeve received in said aperture the diameter of said hole being at least equal to the maximum transverse dimension of said sleeve in unexpanded condition so as to facilitate insertion of said sleeve through the hole and into the aperture, said sleeve having a substantially diametral slot extending along the major part of the length thereof and provided with external teeth which penetrate into the material of said support when the sleeve expands, and an elongated externally threaded member having a first threaded portion of smaller diameter received in and expanding said sleeve into firm engagement with said support, and a second threaded portion of larger diameter receievd in said hole and biting into the material of said support.

References Cited by the Examiner

UNITED STATES PATENTS

| 293,726 | 2/1884 | Fancher | 20—93 |
| 1,539,826 | 6/1925 | Boutelle | 85—42 X |
| 1,638,671 | 8/1927 | Wagner | 189—35 |
| 1,927,389 | 9/1933 | Castner | 85—2.4 X |
| 2,333,968 | 11/1943 | Winter | 151—41.7 X |
| 2,672,659 | 3/1954 | Becker | 20—92 |
| 3,093,934 | 6/1963 | Underhill | 50—268 |

FOREIGN PATENTS 780,878   8/1957   Great Britain.

FRANK L. ABBOTT, *Primary Examiner.*

HENRY C. SUTHERLAND, *Examiner.*

J. L. RIDGILL, *Assistant Examiner.*